United States Patent [19]
Kinard

[11] 3,805,622
[45] Apr. 23, 1974

[54] DEPLOYABLE PRESSURIZED CELL STRUCTURE FOR A MICROMETEOROID DETECTOR

[75] Inventor: William H. Kinard, Williamsburg, Va.

[73] Assignee: The United States of America as represented by the Administrator of the National Aeronautics and Space Administration, Washington, D.C.

[22] Filed: Jan. 28, 1972

[21] Appl. No.: 221,685

[52] U.S. Cl. .................................. 73/432, 73/12
[51] Int. Cl. ...................... G01d 21/00, G08b 21/00
[58] Field of Search ....... 73/432 R; 343/880, 915 A, 343/DIG. 2

[56] References Cited
UNITED STATES PATENTS

| | | | |
|---|---|---|---|
| 3,526,139 | 9/1970 | Mayo et al. | 73/432 R |
| 3,165,751 | 1/1965 | Clark | 343/DIG. 2 |
| 3,326,624 | 6/1967 | Maydell et al. | 343/915 A |
| 3,524,190 | 8/1970 | Killion et al. | 343/880 |

*Primary Examiner*—S. Clement Swisher
*Attorney, Agent, or Firm*—Howard J. Osborn; John R. Manning

[57] ABSTRACT

This disclosure comprises a plurality of individual pressurized cells which are caused to leak in response to a micrometeoroid penetration, the leak being sensed by appropriate instrumentation. The novelty lies in the structure whereby the plurality of cells may be rolled into a compact arrangement such that the volume of the micrometeoroid detector is small and therefore readily packed in a payload of a launch vehicle. Once the payload has been placed in orbit, the rolled up cells can be released, pressurized and provide a relatively rigid, large surface area for detecting micrometeoroid penetration.

6 Claims, 10 Drawing Figures

DEPLOYABLE PRESSURIZED CELL STRUCTURE FOR A MICROMETEOROID DETECTOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to a deployable pressurized cell structure for recording micrometeoroid penetration and has particular utility in space experiments wherein minimization of weight is essential while simulating the surface area of a large vehicle.

2. Description of the Prior Art

The measurement of micrometeoroid penetration is known in the art. One type of system heretofore utilized is a capacitor penetration detector comprising two parallel plates separated by a dielectric and connected to a circuit for applying a voltage across the two plates. The current between the plates is measured and if the plates are perforated by micrometeoroids, the section of the plates so perforated is transformed into a short-lived plasma which momentarily conducts current between the plates. Consequently, the current is detected and recorded as a perforation. Another type of prior art system comprises a light-sensitive penetration detector which consists of a light-sensitive unit placed behind a target plate to observe the flash produced at the back of the target when it is perforated by a micrometeoroid. The light-sensitive unit detects the flash, in either the visual or infrared ranges and produces an electrical signal indicative of a perforation. The Lundeberg U.S. Pat. No. 3,277,724 shows two concentric, inflatable and deployable spheres using a capacitor-type sensor to record impacts and light sensors to estimate particle size.

Yet another type of prior art system to measure micrometeoroid penetration comprises a fiber optic perforation detector. One kind consists of a layer of light guides behind a target plate. At each end of the plate the light guides are collected into a bundle and placed in front of a light-sensitive unit. When a micrometeoroid perforates the target plate and breaks a fiber, the light from the puncture flash is transmitted by the light guides and is detected by the light-sensitive units. Another kind of fiber optic penetration detector consists of a layer of light guides behind a target plate. The light guides are collected into a bundle at one end of the plate and are positioned in front of a light source. At the other end of the plate each fiber is connected to a light-sensitive unit. Any fiber broken by a micrometeoroid perforating the target plate will not transmit light. The detector is interrogated periodically by checking each fiber for light transmittance. Any fiber not transmitting light is thus recorded as a penetration by a micrometeoroid.

Yet another type of micrometeoroid penetration detector comprises a non-deployable pressurized cell which consists of a leak-proof chamber filled with a gas. When the chamber wall is perforated by a micrometeoroid, the gas leaks out into space, thereby causing a decrease in pressure in the chamber and when the pressure drops to a predetermined level, a switch is activated and the perforation is recorded. The Gurtler, U.S. Pat. No. 3,238,774 is an example of this latter type of system wherein a satellite which has been placed into space and subjected to micrometeoroid punctures, is provided with a test material including a pressure cell which will leak in response to micrometeoroid punctures causing a switch to open and thereby signal the satellite's telemeter of the puncture.

The pressurized cell-type detectors are the most reliable devices known in the prior art to measure micrometeoroid penetration. This is because a pressure cell will definitely lose its internal pressure if punctured by a micrometeoroid in space, and the detection of this pressure loss can be accomplished in a very reliable manner. Further, a pressure cell can be fabricated in such a manner that its internal pressure will be maintained for a reasonable lifetime in space. The other described micrometeoroid detection systems depend upon certain assumed phenomena accompanying a micrometeoroid penetration in space. Present-day knowledge concerning micrometeoroids in space and of their impact phenomena at micrometeoroid impact velocities is not sufficient to prove that these phenomena do, in fact, exist. For example, the degree of ionization in a crater is unknown and consequently there exists some uncertainty in the performance of the capacitor-type detectors. As another example, uncertainties of the impact flash introduces uncertainty in the performance of light-sensitive and fiber optic type detectors.

The prior art relating to pressurized cell-type penetration detectors is limited to rigid cells that are relatively heavy and difficult to pack on board a given launch vehicle. This, of course, limits the number and area of cells that can be exposed and consequently limits the data gathering capability of a given launch vehicle.

SUMMARY OF THE DISCLOSURE

These and other disadvantages of prior art micrometeoroid penetration detectors are solved by the instant invention relating to a deployable pressurized cell structure for use in a micrometeoroid penetration detector. The pressurized cell structure according to the invention comprises a plurality of individual cells which are caused to leak in response to a micrometeoroid penetration. The consequent drop in internal pressure of the cell causes a pressure monitor switch to be closed thereby providing an indication of the penetration. The cell structure may be deflated and rolled for compact storage at launch and automatically deployed upon reaching the desired orbit and trajectory.

The deployed detector structure according to the invention forms a relatively rigid cell structure having a large deployed surface area but is compatible for use with a compact launch volume and may be used for displaying such devices as solar cells in space with a minimum weight penalty. It also permits a much larger area of material to be exposed in space for measuring the rates of micrometeoroid penetration within the constraints of a given launch vehicle than was previously possible with the rigid type of detector cells of the prior art. Therefore, more data can be obtained with a given launch vehicle.

By utilizing a loss of cell pressure to detect micrometeoroid penetrations, the invention encompasses the most reliable technique available because more confidence can be placed in data so obtained than is possible with detectors that utilize other techniques of detection, such as the capacitor and light-sensitive type detectors previously described herein. Further, since the disclosed invention provides an extremely lightweight deployable structure, it can be used to efficiently display large areas of devices such as the solar cells required for power by most spacecraft. The ability of the detector structures described herein to be rolled for a compact launch configuration, and after launch, to be deployed to a large surface area for micrometeoroid detection in space with no additional structure required, provides distinct advantages to applicant's invention.

DETAILED DESCRIPTION OF THE INVENTION

Figure 1:
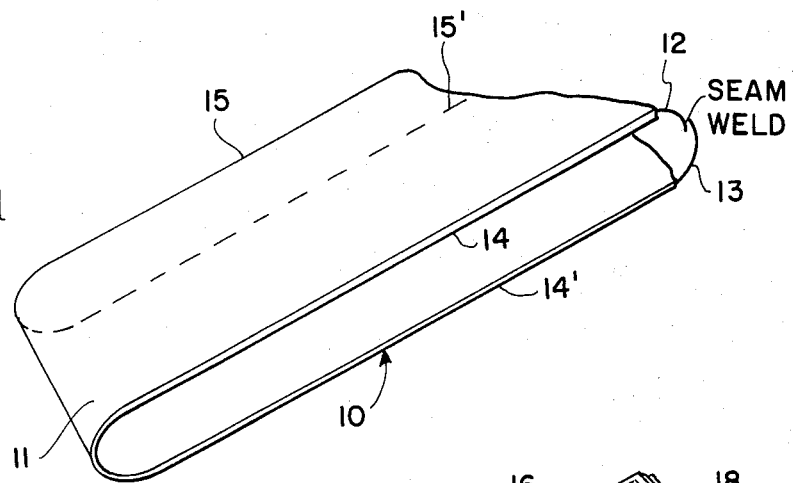
FIG. 1 is an isometric view of one manner in which the individual cells comprising the detector structure may be manufactured.

One manner of making the deployable pressurized detector structure according to the invention for use as a micrometeoroid detector is shown in FIG. 1. In FIG. 1, a single sheet of stainless steel material 10 is folded in double at end 11. The ends 12 and 13 of sheet 10 are connected along their entire lengths 12 and 13 by a seam weld or other equivalent means to form an airtight connection. A similar seam weld or other equivalent means is used to connect ends 14 and 14' and 15 and 15' in an air-tight manner.

Figure 2:
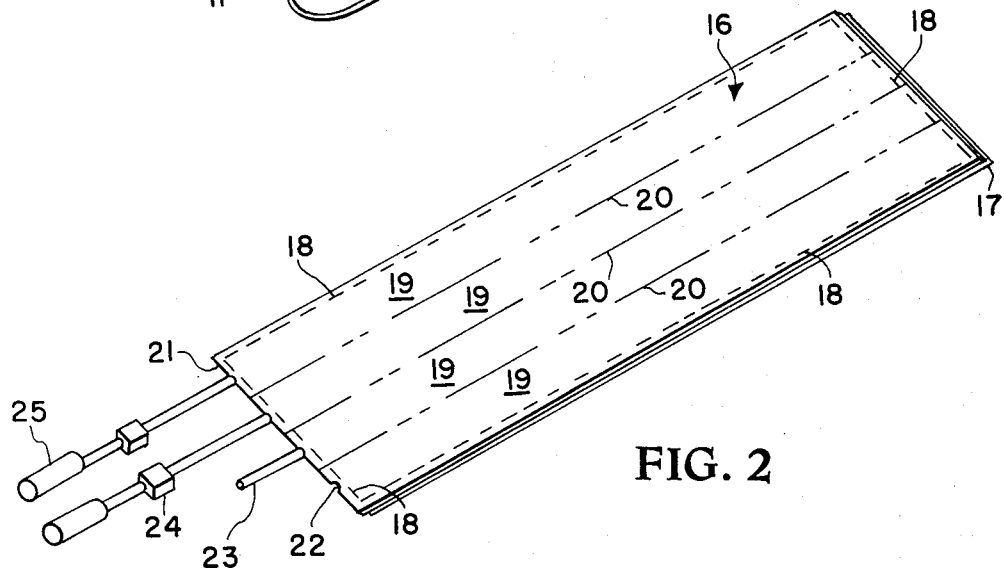
FIG. 2 is an isometric view showing another manner of manufacturing the individual cells comprising the detector structure.

Alternatively, the detector structure may comprise two identical sheets of material 16 and 17 as shown in FIG. 2 having a peripheral seam weld 18 defining an air-tight connection between the two sheets. In both the embodiments of FIGS. 1 and 2, the detector structure is subdivided into individual cells 19 that extend the entire length of the detector structure, by longitudinal seam welds 20. End 21 of the detector structure of FIG. 2 defines small apertures 22 at the end of each individual cell into which pressurization tubes 23 are inserted. A pressure monitoring switch 24 is attached to the other end of each of the pressurization tubes 23 and a pressurization source 25 may be connected to the pressure monitoring switch if required. The various components of the detector structure including pressurization tubes, pressure monitor switches, and pressurization sources, are fitted together in an air-tight manner. Further, the embodiment of FIG. 1 is also fitted with pressurization tubes, pressure monitoring switches, and pressurization sources (if the latter elements are desired), similarly in air-tight manner as described with relation to FIG. 2.

Figure 3A:
FIGS. 3a, 3b and 3c are isometric views illustrating how the detector structure may be rolled for placement in compact launch vehicles.
Figure 3B:
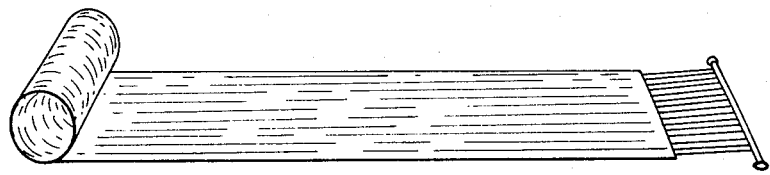
Figure 3C:
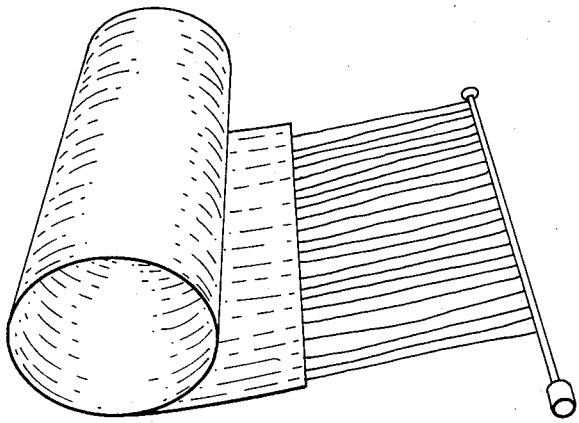

The detector cells may be sealed with a low, internal pressure if it is not desired to use pressurization sources. In this aspect of the invention, the detector structure is rolled on a mandrel to the configuration required for launching, using sufficient pressure on the mandrel to compress the internal gas and thus flatten each cell. FIGS. 3a, 3b and 3c illustrate this procedure, with FIG. 3a showing the detector structure in unrolled condition, FIG. 3b showing the detector structure in partially rolled condition, and FIG. 3c showing the detector structure in almost completely rolled condition. After completing the rolling process as shown in FIG. 3c, the rolled detector structure is clamped by clamp 26. One of several state of the art clamping devices that will facilitate the later release of the rolled detector structure when it is placed in space, however, may be used. When this is accomplished, the clamping device is released and as a result of the internal pressure in each individual cell of the detector structure and the vacuum of space, the detector structure will unroll into a flat, rectangular plane, thus exposing itself to micrometeoroid impacts as shown in FIG. 3a.

If pressurization sources are used, the source of pressure is sealed from its associated cell until the detector structure is deployed in space. Prior to deployment, the cells are sealed in an evacuated state and rolled as previously described. However, since there is no internal cell gas pressure, little pressure on the mandrel is required during the rolling process. The rolled detector structure is clamped for launch and the clamp is released after the spacecraft is placed in space in the desired trajectory. After release of the clamp, the seal between each pressurization source and its associated detector cell is broken, as for example, by a valve structure (not shown) and the pressurization sources pressurize the cells, causing unrolling of the detector structure into a flat rectangular plane for the detection of micrometeoroid penetration.

In either embodiment, after the detector structure is unrolled in space, a micrometeoroid penetration of any cell is detected as a loss in the internal pressure of that particular cell by the associated pressure monitoring switch. Once punctured, a given detector cell is no longer usable as a detector and the area of that cell must no longer be considered as a part of the experiment. Consequently, a sufficient number of individual cells is formed to insure that a desired number of micrometeoroid penetrations can be detected before an appreciable part of the total usable area of the detector is lost.

Figure 4:
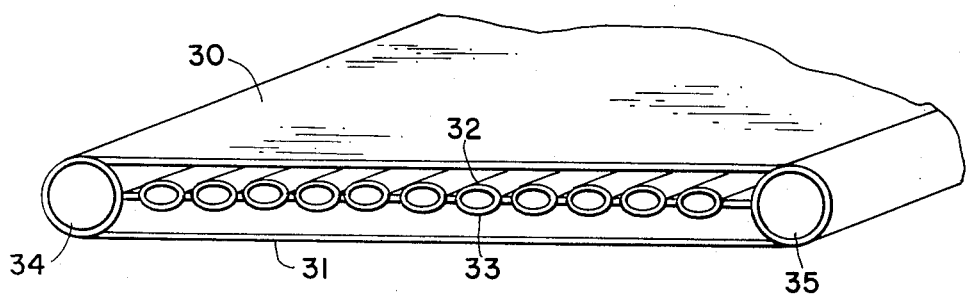
FIG. 4 shows another embodiment of the detector structure according to the invention in inflated condition wherein it is deployed for micrometeoroid penetration.
Figure 5:
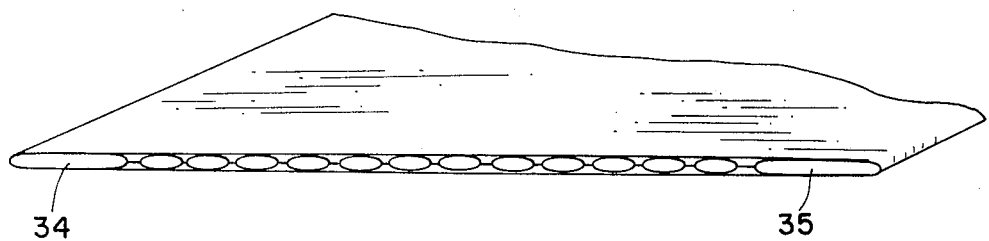
FIG. 5 shows the configuration of the detector structure of FIG. 4 in deflated condition wherein it is ready for rolling for use in a compact launch vehicle.

In another embodiment of the detector structure according to the invention, sheets are suspended opposite each surface of the cell walls. FIG. 4 shows sheets 30 and 31 suspended on opposite sides of the surfaces 32 and 33 of the cell walls, between two inflated tubes 34 and 35 positioned respectively on each side of the detector structure. This is the deployed condition. When tubes 34 and 35 are deflated, they flatten thus allowing sheets 30 and 31 to collapse against their respective cell wall surfaces and the entire unit may then be rolled for placement in the launch vehicle. FIG. 5 shows the structure of FIG. 4, with the tubes 34 and 35 being deflated for the rolling procedure. The detector arrangement shown in FIGS. 4 and 5 will detect those micrometeoroids which penetrate one of sheets 30 and 31 and the cell wall of a detector. If desired, an additional set of pressurized cells could be positioned between the outer sheets 31 and 32 and the walls of the inner cell structure 36 for detecting micrometeoroid penetrations of either or both sheets.

Figure 6B:
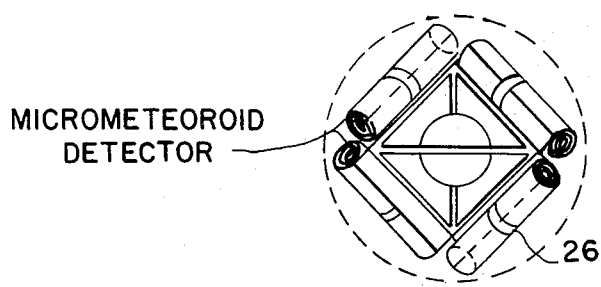
FIGS. 6a and 6b illustrate the position of the rolled detector structures in a spacecraft in the launch configuration.
Figure 6A:
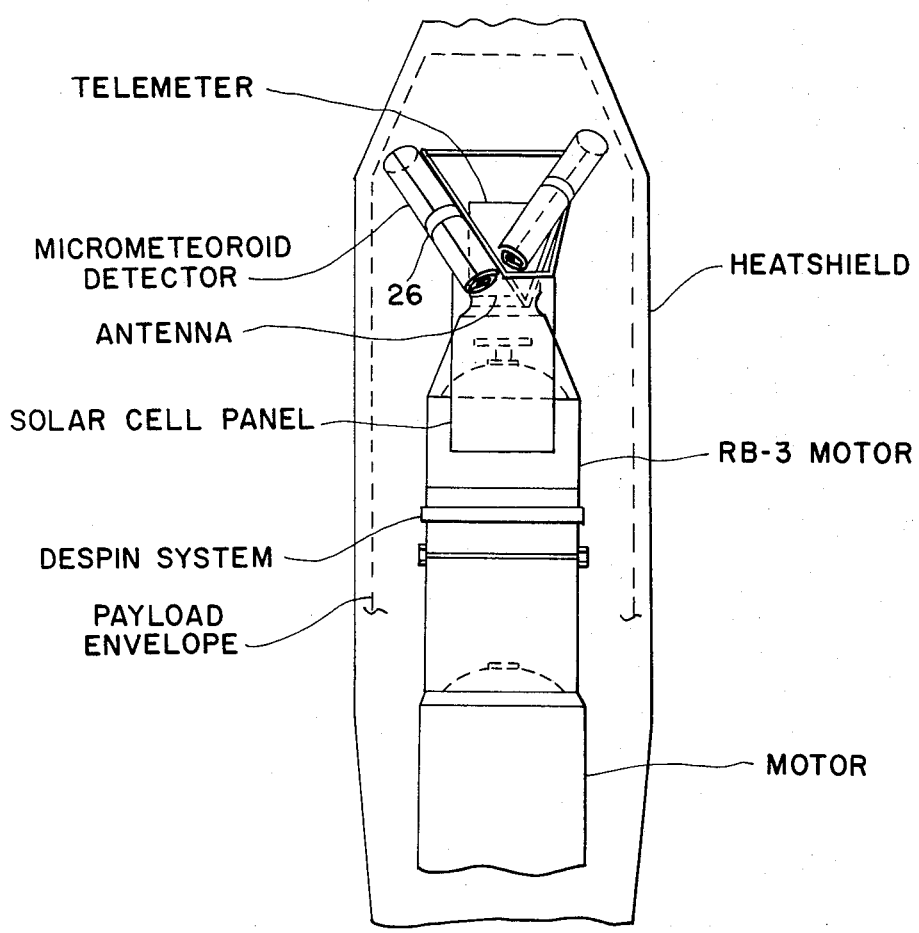
Figure 7:
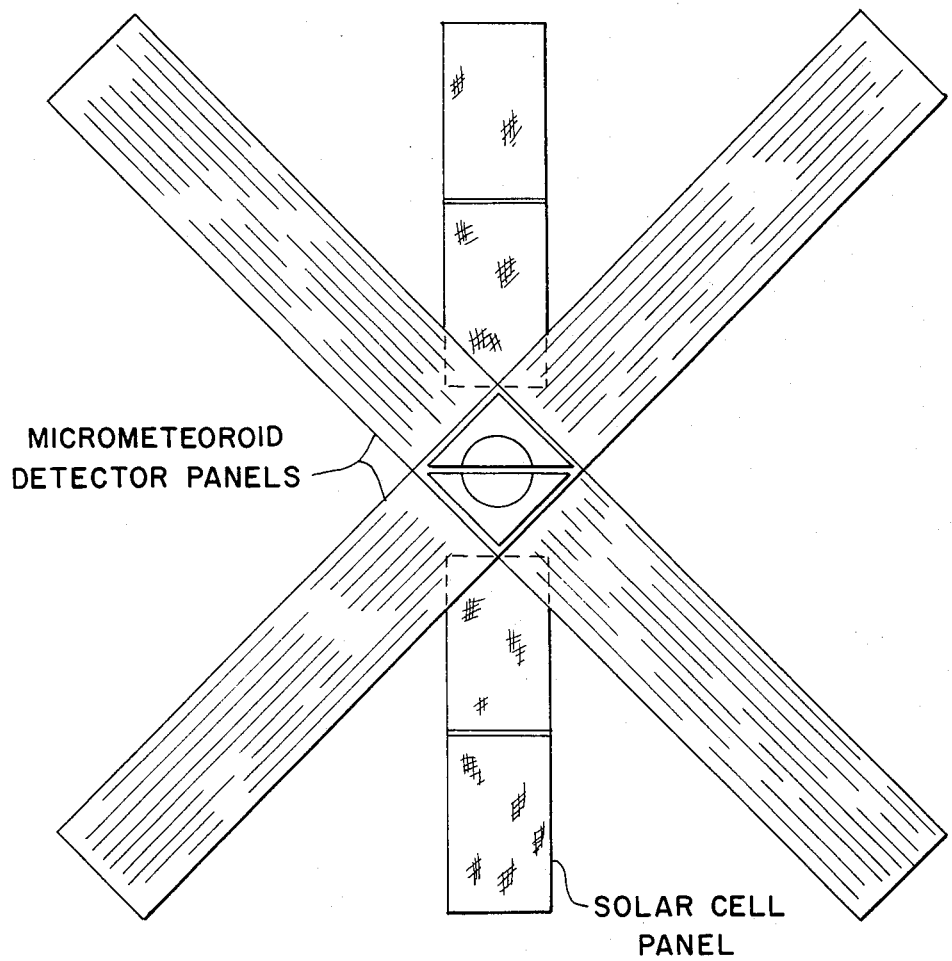
FIG. 7 illustrates the detector device of FIGS. 6a and 6b in deployed condition wherein it may detect micrometeoroid penetrations.

FIGS. 6a and 6b illustrate one of the many possible spacecraft configurations for using the detector structure described herein wherein the detector structures are rolled and placed inside the heat shield of the spacecraft. FIG. 6a shows the relative positioning of the detector structures within the spacecraft and FIG. 6b shows the relationship of the four detector structures illustrated. In the configuration showsn, the detector structures, when deployed, form four wings as shown in FIG. 7, each wing being slanted such that they resemble propellors of opposite pitch. This configuration can sense micrometeoroids traveling in any direction relative to the spacecraft.

What is claimed as new and desired to be secured by letters patent of the United States is:

I claim:

1. A detector for measuring micrometeoroid penetrations comprising:
   detector structure means having a relatively thin, a flexible surface of planular configuration and defining a plurality of individual air-tight cells, whereby the detector structure means may be rolled to a compact condition,
   an individual pressure measurement means connected to each of the individual cells to measure the pressure therein,
   pressurization means to cause the detector structure to unroll when a predetermined criterion has been satisfied to deploy the detector structure in substantially planular configuration and to supple pressure for measurement of micrometeoroid penetration, penetration of a given one of the plurality of individual cells causing a leak to occur therein with the corresponding decrease in pressure being measured by the thereto connected pressure measurement means.

2. A detector for measuring micrometeoroid penetrations as recited in claim 1 wherein the individual cells are sealed with a low, internal pressure, and further comprising:
   clamp means to clamp the detector structure in the rolled condition and operative to be released when the predetermined criterion has been satisfied, whereby release of the clamp means causes the low, internally pressurized cells to cause the detector structure to unroll and thereby deploy the detector structure.

3. A detector for measuring micrometeoroid penetrations as recited in claim 1 wherein the individual cells are sealed in a pressure evacuated state before being rolled and further comprising:
   clamp means to clamp the detector structure in the rolled condition and operative to be released when the predetermined criterion has been satisfied,
   pressurization means connected to the individual cells operative to pressurize the latter when the clamp means are released to pressurize the individual cells causing the detector structure to unroll and thereby deploy the detector structure.

4. A detector for micrometeoroid penetration as recited in claim 1, further comprising:
   first and second inflatable tubes connected to and substantially continuous with opposite sides of the detector structure, each having a longitudinal axis in the same direction as the longitudinal axes of the individual cells,
   first and second sheets connected between the first and second inflatable tubes, the first sheet being positioned oppositely and substantially coextensive with one planular surface of the detector structure, the second sheet being positioned oppositely and substantially coextensive with the other planular surface of the detector structure,
   the first and second inflatable tubes being deflated before the detector structure is rolled causing the first and second sheets to collapse against their respective opposite detector structure planular surfaces, the first and second tubes being inflated when the detector structure is deployed to cause a space to be defined between the first and second inflatable tubes and their respective opposite structure planular surfaces.

5. A detector for micrometeoroid penetration as recited in claim 4 further comprising:
   additional detector structures connected between the first and second sheets and their respective opposite planular surfaces of the detector structure, and in the same planular plane therewith.

6. A plurality of detector structures as recited in claim 1, rolled and arranged in a predetermined configuration with respect to each other for compact storage inside the heat shield of a spacecraft during launching thereof.

* * * * *